United States Patent Office 3,458,789
Patented July 29, 1969

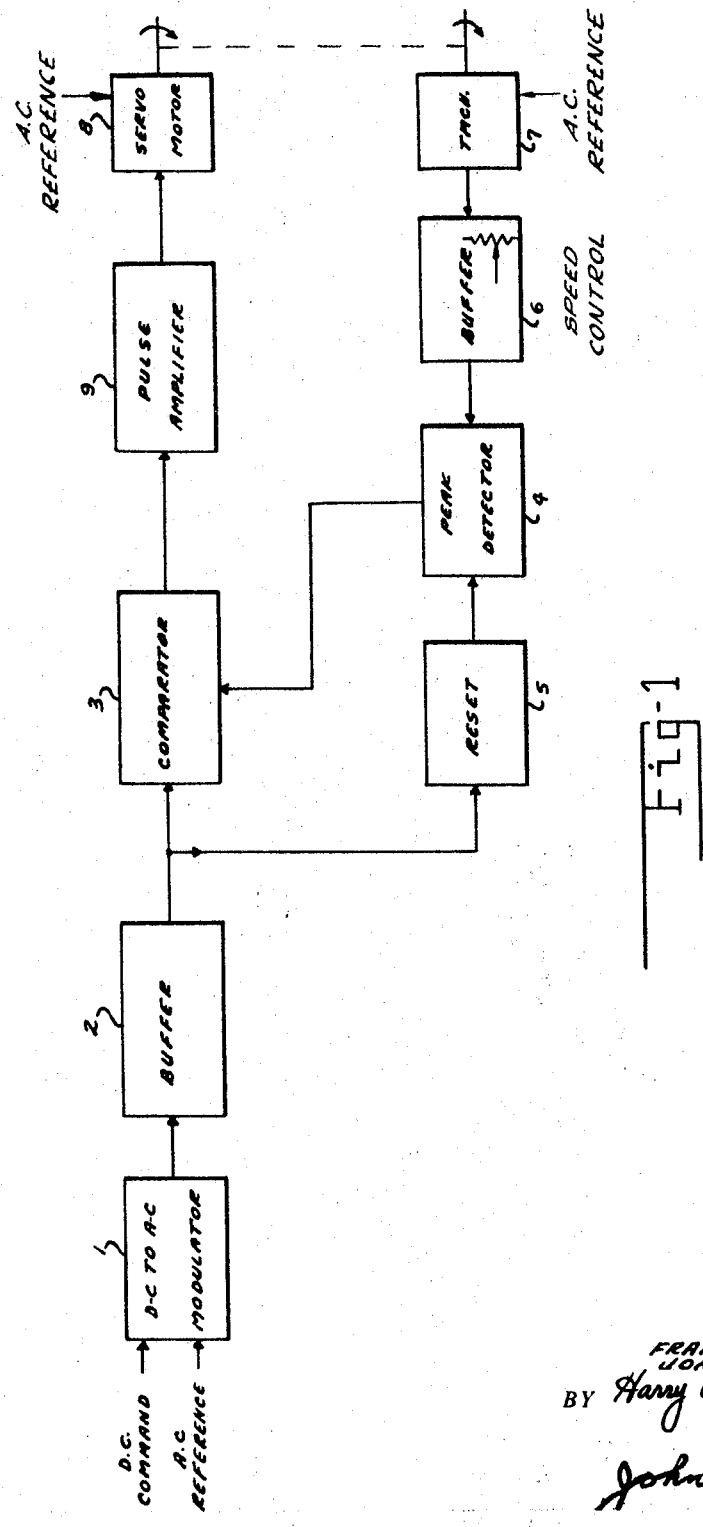

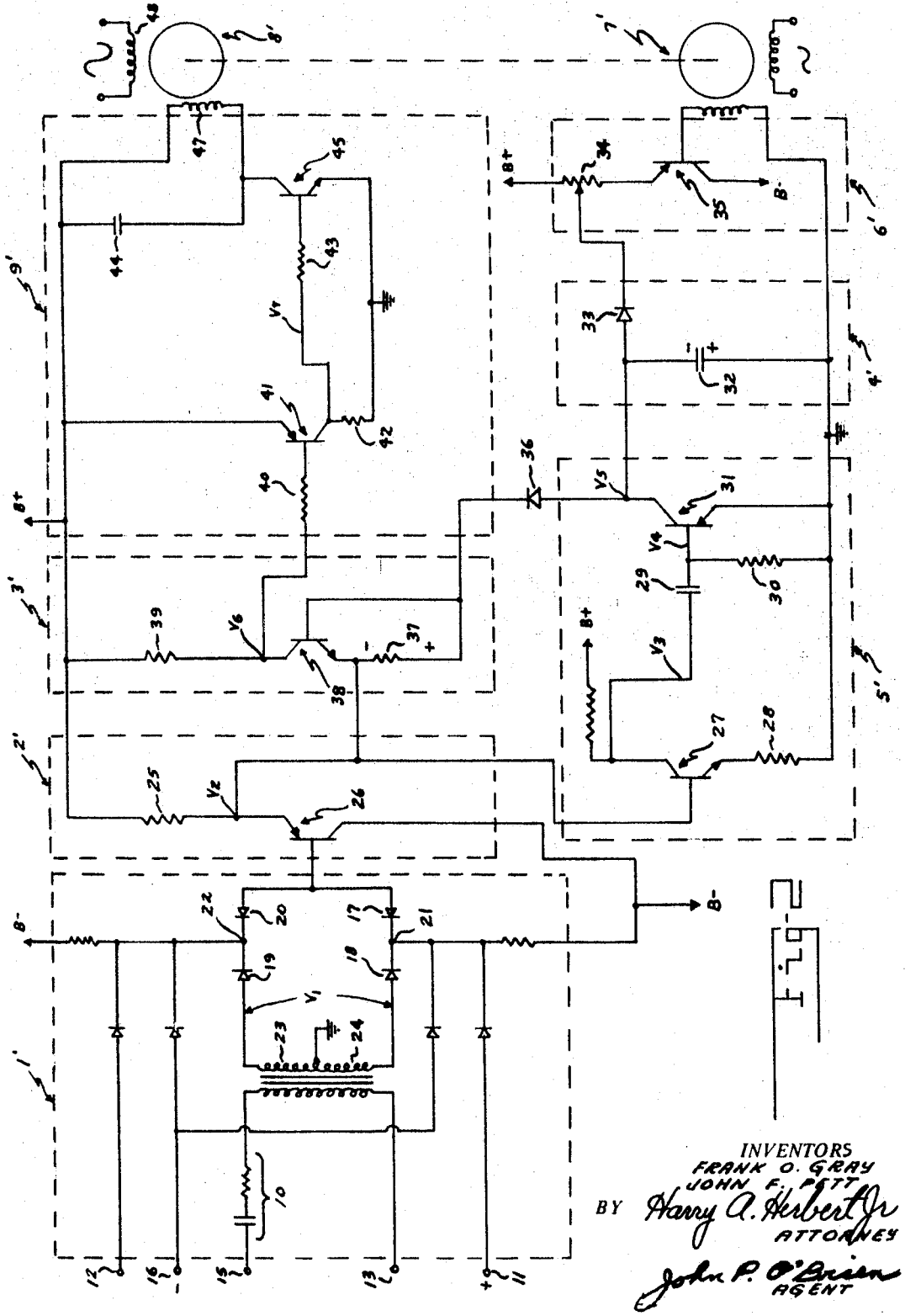

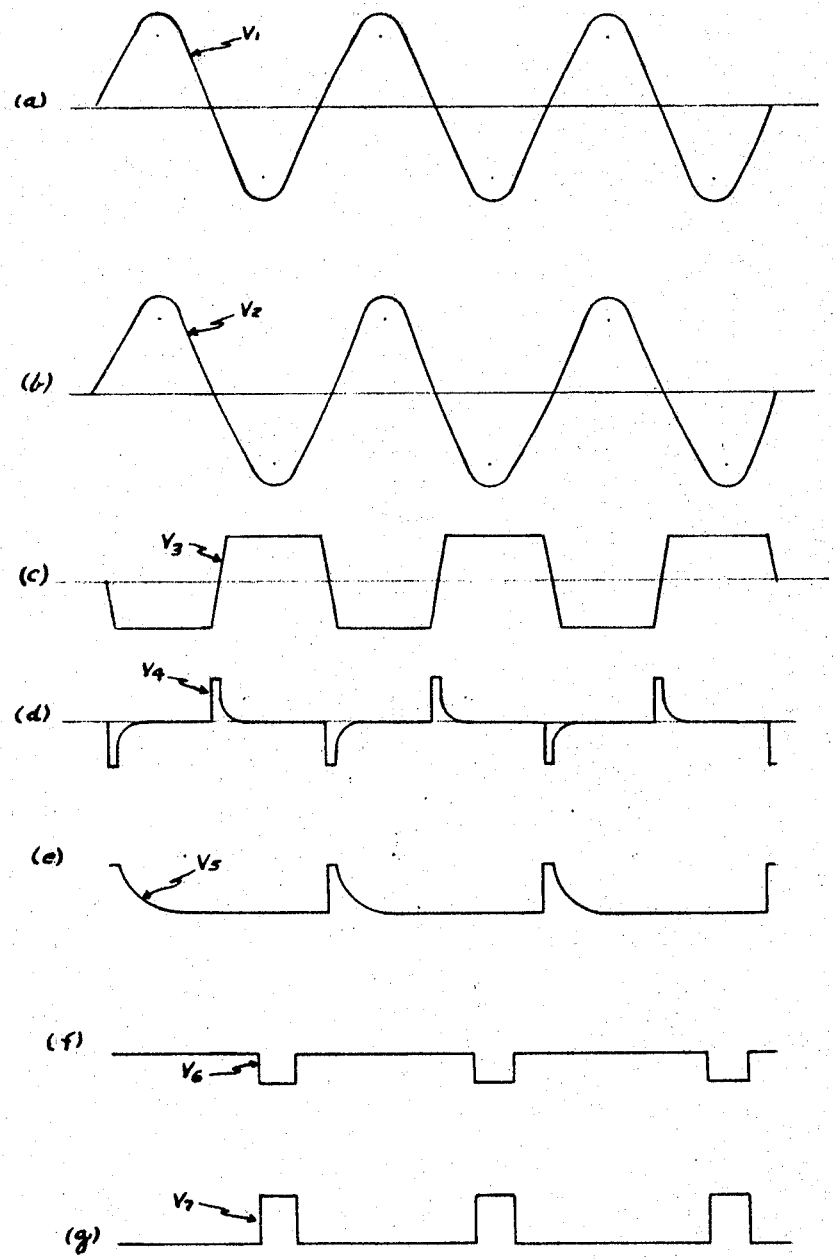

3,458,789
PULSE WIDTH MODULATED SERVO AMPLIFIER HAVING RAPID FORWARD, STOP, AND REVERSE CONTROL
Frank O. Gray, Palos Verdes, and John F. Pett, Sunnyvale, Calif., assignors to the United States of America as represented by the Secretary of the Air Force
Filed Oct. 28, 1966, Ser. No. 591,061
Int. Cl. H02p 1/40, 1/42; H02k 17/02
U.S. Cl. 318—207                         1 Claim

ABSTRACT OF THE DISCLOSURE

The alternating current feedback speed control voltage from the tachometer of an alternating current servo system is converted into a substantially rectangular, constant amplitude, pulse train in quadrature to the reference alternating current voltage, and having a pulse width proportional to the tachometer feed back voltage. The rectangular pulse is amplified by a pulse amplifier and applied through a resonant circuit to the control phase winding of the servomotor to control the motor speed. The direction of rotation of the servomotor and the stop condition are controlled by direct current command voltages which shift the phase of the quadrature rectangular pulse through 180 degrees for direction control. For the stop condition the direct current command voltage blocks all voltage to the control phase winding of the servomotor.

---

Alternating current servomotors usually consist of a two-phase induction motor having a fixed phase winding and a control phase winding. Conventionally, a sinusoidal reference phase voltage is applied to the fixed phase winding and a sinusoidal control phase voltage is applied to the control phase winding. The control phase voltage is displaced 90° in phase from the fixed phase to provide maximum torque to the servo motor.

In conventional speed stabilized A.C. servo systems, a servo amplifier is employed to produce the proper control phase voltage that is applied to the control phase winding. The control phase voltage is derived in the servo amplifier by taking the difference between the input command voltage and a speed dependent feedback voltage, as is well known in the control system art.

In a type O control system which yields a constant speed output for a constant signal input, feedback stabilization is accomplished by utilizing a tachometer. The tachometer is mechanically coupled to the servo motor and delivers to the servo amplifier a feedback voltage proportional to the speed of the servo motor.

In order to adjust the speed of the servo motor, prior art servo amplifiers vary the amplitude of the control phase voltage. However, it has been found that when using the tachometer feedback stabilization technique and operating over a wide temperature range, intolerable errors occurred in the control phase voltage. These errors resulted from the phase sensitive elements in the feedback loop shifting the phase of the feedback voltage as the temperature varied. Consequently, temperature variations would cause a phase shift of the sine wave of the control phase voltage. A shift in phase of the control phase voltage means the 90° phase relation between the reference phase voltage and the control phase voltage is no longer present, resulting in less torque being applied to the rotor of the servo motor.

The servo amplifier of the present invention is designed to operate over extreme temperature variations without being affected by phase shifts when using tachometer feedback stabilization. At the same time, the design of the amplifier permits it to operate more efficiently than the linear amplifiers of conventional systems. The increase in efficiency comes about by amplifying the control phase energy in the form of a substantially rectangular constant amplitude pulse, rather than in the form of a sine wave, thus permitting the use of highly efficient nonlinear amplifiers. The amplified pulse energy is converted to sine wave form by reasonating the control phase input of the servo motor. In order to control the servo motor speed, the control phase energization is varied by varying the width of the constant amplitude pulses in accordance with the tachometer output. By varying the pulse width as a function of the peak amplitude only of the tachometer output, the effect of phase shifts in the feedback circuit is nullified.

The servo amplifier system herein disclosed is especially suited to "bang-bang" types of servo systems where the servomotor is made to scan either one direction or the other with constant velocity and fast response of change of direction.

One object of this invention is to provide a servo amplifier whose output is insensitive to phase shift errors arising in the feedback loop.

Another object is to provide a more efficient servo amplifier requiring less power to operate it.

The above-mentioned and other features and objects of this invention and the manner of attaining them will become more apparent and the invention itself will best be understood by reference to the following description taken in conjunction with the accompanying drawings, wherein:

FIG. 1 is a block diagram of a servo amplifier system embodying the invention;

FIG. 2 is a schematic showing of a transistorized servo amplifier system embodying the invention; and FIG. 3 consists of a set of curves which are explanatory of the operation of the system shown in FIG. 2.

The servo system as depicted in FIGS. 1 and 2 is a type O control system which yields a constant speed output for a D-C input command voltage of either forward or reverse. Feedback stabilization and speed control are accomplished by utilizing a tachometer with manually determinable output as will be explained hereinafter.

Referring to FIG. 1, the D-C to A-C modulator 1 converts the start, stop and reverse D-C command voltages to an A-C voltage of the proper phase by modulating it with an A-C reference voltage.

Buffer circuits 2 and 6 consist of emitter follower circuits which provide impedance matches so as to prevent the loading down of the stages before them.

Peak detector 4 converts the A-C feedback voltage from the tachometer and buffer circuit 6 into a D-C level voltage which is used to bias the comparator 3.

The negative going portion of the A-C modulated command voltage is compared with the detector output voltage in comparator 3. The resultant output of comparator 3 is a pulse whose width is a function of the amplitude of the tachometer feedback voltage. This comparison is performed on a discrete time sampling basis by discharging and charging the detector during each period of the A.C. cycle. This discharging function is performed by the reset circuit 5 which discharges the detector 4 during the positive going portion of each cycle.

The output of the servo amplifier is coupled to the control phase winding of servo motor 8 through pulse amplifier 9. A capacitor is placed in parallel with the control phase winding and tuned to the operating frequency of servo motor 8. The resulting voltage applied to the control phase winding is the fundamental frequency of a constant amplitude pulse which is displaced 90° from the reference phase voltage.

Referring to FIG. 2, there is shown a transistorized servo amplifier schematic of this invention. In FIG. 2, the respective circuit elements corresponding to those shown in FIG. 1 have been designated with prime numbers.

A D-C command voltage is applied across terminals 11 and 12 to cause servo motor 8' to run either forward or reverse at a constant speed as determined by control 34. The polarities of the D-C command voltage terminals 11 and 12 shown in FIG. 2 are for rotating servo motor 8' in the forward direction. To reverse servo motor 8', the polarities of terminals 11 and 12 are reversed. The stop command voltage is applied to terminal 16. As will be explained herein, servo motor 8' is de-energized by applying to terminal 16 a positive D-C voltage that causes the modulator 1' to be shut off.

An A-C reference voltage is applied across terminals 13 and 15. This reference voltage is the same as applied to the fixed phase winding 48 of servo motor 8' and the energized winding of tachometer 7'. The series connected capacitor-resistor 10 together with the inductance of the transformer's primary winding form a quadrature phase shifting network making the transformer secondary voltage $V_1$ in quadrature with the A-C voltage at terminals 13, 15.

When a forward D-C command voltage $V_{d-c}$ is applied to terminals 11 and 12, the polarities are as shown in FIG. 2. In this condition, the positive potential at junction 21 prevents diodes 17 and 18 from conducting. The negative potential at junction 22 is sufficiently negative to permit diodes 19 and 20 to conduct for both positive and negative portions of reference voltage $V_1$. The wave form of reference voltage $V_1$ is illustrated in FIG. 3(a). The output current path of D-C to A-C modulator 1' is from ground through transformer coil 23, through diodes 19 and 20, through the emitter-base junction of transistor 26, through resistor 25 to B+ and back to ground. The resulting voltage $V_2$ appearing across resistor 25 is depicted in FIG. 3(b).

For the reverse condition, the polarities at terminals 11 and 12 are reversed (opposite to those shown in FIG. 2). This condition causes diodes 19 and 20 to be cut off and diodes 17 and 18 to conduct. The output current path of the D-C to A-C modulator 1' for this condition is from transformer coil 24, through diodes 17 and 18, through the base-emitter junction of transistor 26, through resistor 25 to B+. The resulting voltage wave form appearing across resistor 25 would have the reverse phase as that for the forward condition since the secondary voltages across coils 23 and 24 are 180° out of phase. In both cases $V_2$ has a quadrature phase relation to the voltage at terminals 13, 15, in one case leading and in the other lagging.

To stop servo motor 8', a positive voltage is applied to terminal 16. This causes diodes 17 through 20 to stop conducting. Consequently, there is no modulated voltage output from modulator 1' and motor winding 47 is de-energized.

The A-C modulated command voltage $V_2$ is applied between the base of transistor 27 and ground. Resistor 28 is selected so that transistor 27 will be overdriven to provide an output voltage $V_3$ having the wave form shown in FIG. 3(c).

Capacitor 29 and resistor 30 form a conventional differentiating circuit. The wave form of the differentiated voltage $V_4$ is depicted in FIG. 3(d).

Each negative half cycle of tachometer 7' output voltage charges capacitor 32 of peak detector 4'. Diode 33 is used to block the positive half cycles in the usual manner. Emitter follower 6' consisting of transistor 35 and resistor 34 matches the impedances between the peak detector 4' and tachometer 7' to avoid loading down tachometer 7'. Resistor 34 is a potentiometer which can be adjusted to vary the speed of servo motor 8' in a manner to be explained later.

Capacitor 32 discharges through transistor 31 during each negative pulse of differentiated voltage $V_4$. During the remaining portions of each cycle, transistor 31 is cut off. The wave form of the detected voltage $V_5$ is shown in FIG. 3(e). As can be seen from FIG. 3(e), the detected voltage $V_5$ maintains a maximum negative magnitude during the second 180° period of each cycle. This magnitude is directly proportional to the output voltage of tachometer 7'. It is during the second 180° portion of each cycle that comparator 3' operates to provide the desired negative pulse wave form of the control phase voltage in the manner now to be explained.

When the positive portion of the A-C modulated command voltage $V_2$ is applied to the emitter of transistor 38, transistor 38 will not conduct because there is no bias across its emitter-base junction. The reason there is no bias is that no current can flow through resistor 37 to establish a voltage drop across resistor 37 since diode 36 would block any such current. On the negative going portion of each cycle of command voltage $V_2$, there will be no current flow through resistor 37 until the magnitude of $V_2$ becomes greater than detector voltage $V_5$. At that point in the negative half cycle, diode 36 will conduct and provide a voltage drop across resistor 37. Transistor 38 will conduct until the negative portion of $V_2$ is again less than voltage $V_5$. By designing transistor 38 to have high gain and driven to cut off for any small input voltage, a constant amplitude output pulse $V_6$ is obtained across resistor 39. The width of the output pulse $V_6$, as shown in FIG. 3(f) is determined by the amplitude of the detector voltage $V_5$.

It can now be seen how the magnitude of detector output voltage $V_5$ determines the pulse width of comparator output voltage $V_6$. Diode 36 acts as a switch which is turned on when $V_2$ becomes more negative than $V_5$ and turns off when $V_2$ again becomes less negative than $V_5$. When the negative detector output voltage $V_5$ increases due to an increase in the speed of tachometer 7', the width of comparator output voltage $V_6$ is proportionally decreased which will cause servo motor 8' to return to its constant speed. Since transistor 38 is designed to have high gain and be overdriven for any applied voltage, the output voltage of comparator 3' is a constant amplitude pulse whose width varies in direct proportion to changes in the detector output voltage $V_5$.

The magnitude of detector output voltage $V_5$ is a function of the speed of tachometer 7' and the setting on potentiometer 34. By adjusting the setting on potentiometer 34, the pulse width of comparator output voltage $V_6$ will be varied proportionally, resulting in changing the speed of servo motor 8'.

From the foregoing, it can be seen that the pulse width of comparator output voltage $V_6$ is insensitive to phase shift errors introduced in the feedback loop.

The comparator output voltage $V_6$ is applied across resistor 40 and amplified by transistor 41 in a conventional manner. The resulting wave form $V_7$ which appears across resistor 42 is illustrated in FIG. 3(g).

The amplified pulse $V_7$ is applied across the base-emitter junction of transistor 45. Resistor 43 provides the proper D-C current operating conditions for transistor 45. The control phase winding 47 is connected to the output transistor 45. Capacitor 44 is connected in parallel to winding 47. Its capacitance value is selected so that the parallel L-C circuit is tuned to the fundamental frequency of pulse wave $V_7$.

The resulting control phase voltage appearing across winding 47 is a sine wave which is displaced 90° from the fixed phase voltage on winding 48. Since the pulse width of comparator voltage $V_6$ is independent of phase shift errors in the feedback loop, the control phase voltage is also insensitive to phase shift errors, for its magnitude is a direct function of the pulse width and its phase is always 90° from the fixed phase.

We claim:
1. The improvement for providing immunity to temperature changes and rapid forward and reverse directional control and stop control by respective direct current command voltages, in determinable constant speed, feedback servo systems having a fixed phase winding and a control phase winding alternating current servomotor, an alternating current tachometer feedback voltage generator mechanically coupled to the servomotor, and an alternating current reference voltage energizing the fixed phase winding of the servomotor and energizing the tachometer, the said improvement comprising:
 (a) direct current to alternating current modulating means, responsive to the alternating current reference voltage and the said direct current command voltages for providing quadrature phased alternating current output voltages for directional control and an unmodulated output voltage for stop control, the said modulating means including a resistor-capacitor quadrature phase shifting network;
 (b) a first buffer circuit means for providing an output responsive to the output of the said modulating means;
 (c) a second buffer ciruit means for providing an output responsive to the said feedback voltage of the alternating current tachometer and having manually determinable adjustable electrical speed control means;
 (d) peak detecting means responsive to the said second buffer circuit means for providing a direct current output voltage;
 (e) comparator means responsive to the said peak detecting means and the said first buffer means for providing essentially a rectangular output pulse having a pulse width responsive to the said peak detector direct current output voltage and a phase determined by the voltage output of the said first buffer circuit;
 (f) reset means responsive to the said first buffer circuit means for discharging the said peak detecting means during each positive portion of the alternating current output of the said buffer circuit; and
 (g) pulse amplifier means responsive to the output of the said comparator means and cooperating with the said control phase winding of the alternating current servomotor for amplifying the output of the said comparator means and providing a parallel resonant circuit with the control phase winding.

References Cited

UNITED STATES PATENTS

| | | | |
|---|---|---|---|
| 2,666,169 | 1/1954 | Jarvis | 318—207 XR |
| 2,766,413 | 10/1956 | Young | 318—207 XR |
| 3,109,971 | 11/1963 | Welch et al. | 318—207 XR |
| 3,150,303 | 9/1964 | James et al. | 318—207 XR |
| 3,181,046 | 4/1965 | Sutton | 318—207 XR |
| 3,237,075 | 2/1966 | Sommeria | 318—327 |
| 3,346,771 | 10/1967 | Sutton | 318—341 XR |

ORIS L. RADER, Primary Examiner

G. Z. RUBINSON, Assistant Examiner

U.S. Cl. X.R.

318—18, 327, 341